(No Model.)

J. HURST.
STEAM COOKING VESSEL.

No. 372,416. Patented Nov. 1, 1887.

WITNESSES:
U. N. Rosenbaum
Carl Karr

INVENTOR
Jacob Hurst
BY Gorner Raegener
ATTORNEYS.

United States Patent Office.

JAKOB HURST, OF SYRACUSE, NEW YORK, ASSIGNOR OF ONE-HALF TO ALBERT PHILLIPS, OF SAME PLACE.

STEAM COOKING-VESSEL.

SPECIFICATION forming part of Letters Patent No. 372,416, dated November 1, 1887.

Application filed February 21, 1887. Serial No. 228,283. (No model.)

*To all whom it may concern:*

Be it known that I, JAKOB HURST, of Syracuse, in the county of Onondaga and State of New York, have invented certain new and useful Improvements in Steam Cooking-Vessels, of which the following is a specification.

The object of my invention is to provide a new and improved steam cooking-vessel which is simple in construction and effective in use, and which can be taken apart very readily for the purpose of cleaning all the parts.

The invention consists in the combination, with an exterior vessel provided with a flange or support for supporting an interior vessel, of pipes for conducting steam from the steam-space between the interior and exterior vessel into said interior vessel, all as will be fully described and set forth hereinafter, and finally pointed out in the claims.

Figure 1:
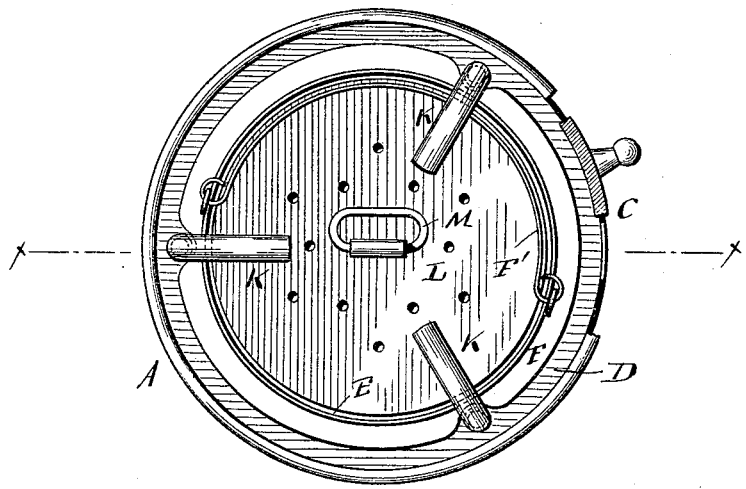
Figure 2:
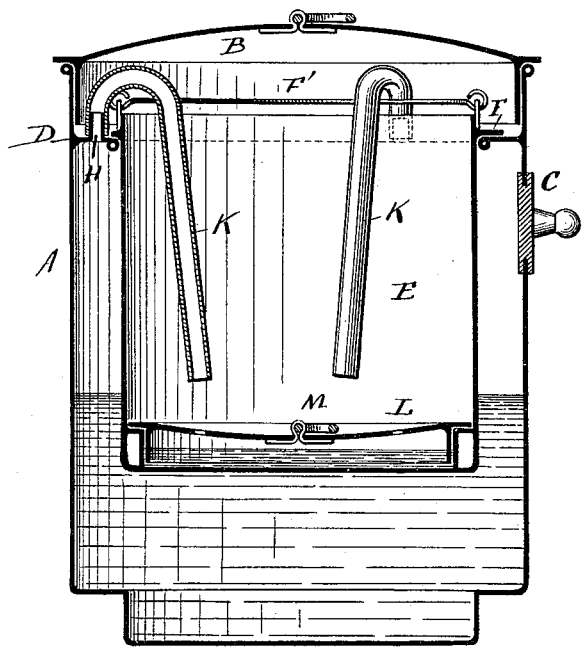
Figure 3:
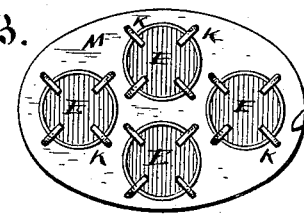

In the accompanying drawings, Figure 1 is a plan view of my improved steam cooking-vessel, parts being broken out and others in section. Fig. 2 is a cross sectional elevation of the same on line $x\ x$, Fig. 1; and Fig. 3 is a plan view of a modified construction.

Similar letters of reference indicate corresponding parts.

The exterior vessel, A, is provided with a close-fitting cover, B, and in its side with a gate or slide, C, for closing an opening through which the water can be poured into the said vessel. A short distance from the top the vessel A is provided with an interior annular flange, D, serving to support the interior vessel, E, which is provided near its top with an exterior annular flange, F, which rests upon the flange D. The vessel E has suitable lugs, to which the bail F' is fastened, by means of which the vessel E can be lifted out of the vessel A. A series of necks, H, project upward from the flange D, and on the same are placed the shorter shanks of approximately U-shaped pipes K, having a longer shank projecting into the vessel E to within a short distance from the bottom of the same. The interior vessel, E, is provided with a false bottom, L, having a handle, M, said interior vessel being provided with suitable supports for said false bottom a short distance above the bottom.

The vessel is placed upon the fire, and the steam generated cannot escape from the steam-space formed between the exterior and interior vessels and the flange D, except through the necks H and pipes K, thus passing into the interior of the vessel E and cooking the contents of the same. When the cooking is finished and the interior vessel, E, and its contents are to be removed, the tubes K are detached from the necks H and the vessel E lifted out of the vessel A. The water of condensation, &c., in the vessel E passes through the apertures in the false bottom L, and collects in that part of the vessel below the said false bottom, and can be poured off after the vessel E has been emptied. For larger cookers the flange is replaced by a plate, M, Fig. 3, having a series of openings for vessels E, and around which openings a series of necks, H, are provided, to permit of fastening the pipes J, projecting into the vessels E, supported by the plate M.

Having thus described my invention, I claim as new and desire to secure by Letters Patent—

1. In a steam cooking-vessel, the combination, with an exterior vessel, A, having a horizontal flange or plate a short distance from its top edge for the purpose of supporting one or more interior vessels, E, of the vessels E, necks H, projecting upward from said flange or plate along the edge of the opening or openings for receiving the vessels E, and of approximately U-shaped pipes K, each having a long and short shank, the shorter shanks fitting on the necks H and the longer ones extending down into the vessel E, substantially as shown and described.

2. The combination of an exterior vessel having a lid and an interior flange, an interior vessel having an exterior flange resting on the flange of the exterior vessel, and U-shaped tubes connecting the space between the vessels with the space in the interior vessel, substantially as set forth.

In testimony that I claim the foregoing as my invention I have signed my name in presence of two subscribing witnesses.

JAKOB HURST.

Witnesses:
JOHN HEÜYLER,
JOHN B. EISENSCHINK.